US010959275B2

(12) United States Patent
Mishra et al.

(10) Patent No.: US 10,959,275 B2
(45) Date of Patent: *Mar. 23, 2021

(54) X2 BROKERING WITH AGGREGATION OPTIMIZATION

(71) Applicant: Parallel Wireless, Inc., Nashua, NH (US)

(72) Inventors: Rajesh Kumar Mishra, Westford, MA (US); Anupam Goyal, Pune (IN); Kartik Shashikant Raval, Pune (IN); Harish Kumar Lohar, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,252

(22) Filed: Jan. 8, 2018

(65) Prior Publication Data
US 2018/0199391 A1    Jul. 12, 2018

Related U.S. Application Data

(60) Provisional application No. 62/443,486, filed on Jan. 6, 2017.

(51) Int. Cl.
*H04W 76/15* (2018.01)
*H04W 92/20* (2009.01)
(Continued)

(52) U.S. Cl.
CPC ........... *H04W 76/15* (2018.02); *H04W 24/02* (2013.01); *H04W 28/08* (2013.01); *H04W 92/20* (2013.01);
(Continued)

(58) Field of Classification Search
CPC ..... H04W 76/10; H04W 76/12; H04W 76/15; H04W 76/25; H04W 80/02; H04W 80/04;
(Continued)

(56) References Cited

U.S. PATENT DOCUMENTS

| 8,644,831 | B2 | 2/2014 | Bae et al. |
| 2009/0270079 | A1 | 10/2009 | Han et al. |

(Continued)

FOREIGN PATENT DOCUMENTS

| CN | 102958197 A | 3/2013 |
| KR | 101189673 B1 | 10/2012 |

(Continued)

OTHER PUBLICATIONS

Konstantinos Samdanis, Xavier Costa-Perez, Vincenzo Sciancalepore, "From Network Sharing to Multi-tenancy: The 5G Network Slice Broker," NEC Europe Ltd., Germany, retrieved from https://arxiv.org/pdf/1605.01201.pdf.

(Continued)

*Primary Examiner* — Ashley Shivers
(74) *Attorney, Agent, or Firm* — Michael Y. Saji; David W. Rouille

(57) ABSTRACT

A method for providing stateful proxying is disclosed, comprising: associating a first base station with a first base station identifier at a signaling protocol gateway, and with a first Internet Protocol (IP) address of the signaling protocol gateway; associating a second base station with a second base station identifier at the signaling protocol gateway, and with a second IP address of the signaling protocol gateway; establishing a first signaling protocol connection between a third base station and the first base station via the signaling protocol gateway with the first base station using the first IP address of the signaling protocol gateway; and establishing a signaling protocol connection between the third base station and the second base station with the second base station using the second IP address of the signaling protocol gateway.

12 Claims, 9 Drawing Sheets

(51) Int. Cl.
*H04W 24/02* (2009.01)
*H04W 28/08* (2009.01)
H04L 29/12 (2006.01)
H04W 88/08 (2009.01)
H04W 88/16 (2009.01)
H04W 8/26 (2009.01)

(52) U.S. Cl.
CPC .......... *H04L 61/2007* (2013.01); *H04W 8/26* (2013.01); *H04W 88/08* (2013.01); *H04W 88/16* (2013.01)

(58) Field of Classification Search
CPC ..... H04W 88/08; H04W 88/12; H04W 88/14; H04W 88/16; H04W 92/045; H04W 92/06; H04W 92/12; H04W 92/20
See application file for complete search history.

(56) References Cited

U.S. PATENT DOCUMENTS

| | | |
|---|---|---|
| 2012/0008528 A1* | 1/2012 | Dunbar ................ H04L 12/462 370/255 |
| 2012/0122503 A1 | 5/2012 | Ma et al. |
| 2012/0263096 A1 | 10/2012 | Masini et al. |
| 2013/0016657 A1 | 1/2013 | Muhanna et al. |
| 2013/0090124 A1 | 4/2013 | Panchal et al. |
| 2013/0303114 A1 | 11/2013 | Ahmad et al. |
| 2014/0133456 A1 | 5/2014 | Donepudi et al. |
| 2014/0295879 A1* | 10/2014 | Yang .................... H04W 64/00 455/456.1 |
| 2014/0308959 A1 | 10/2014 | De Benedittis et al. |
| 2015/0063295 A1 | 3/2015 | Himayat et al. |
| 2015/0109999 A1 | 4/2015 | Godin |
| 2015/0110008 A1* | 4/2015 | Puthenpura .......... H04W 16/18 370/329 |
| 2015/0215774 A1* | 7/2015 | Huang .................. H04W 76/10 455/422.1 |
| 2015/0230220 A1* | 8/2015 | Li .......................... H04L 5/0053 370/329 |
| 2015/0257051 A1* | 9/2015 | Rao .................... H04W 36/0061 455/439 |
| 2015/0358260 A1* | 12/2015 | Jordan ................ H04L 51/046 709/206 |
| 2016/0044531 A1 | 2/2016 | Papa et al. |
| 2016/0088470 A1* | 3/2016 | Sivavakeesar .......... H04W 8/26 455/435.1 |
| 2016/0094968 A1 | 3/2016 | Papa et al. |
| 2016/0105919 A1* | 4/2016 | Kawaguchi ........... H04W 24/02 370/329 |
| 2016/0183137 A1 | 6/2016 | Fukuta et al. |
| 2016/0205060 A1* | 7/2016 | Gunnarsson ........ H04L 61/2076 370/328 |
| 2016/0227449 A1* | 8/2016 | Sivavakeesar ........ H04W 88/16 |
| 2016/0255677 A1* | 9/2016 | Masini .................. H04W 36/30 370/328 |
| 2016/0316416 A1* | 10/2016 | Raval ................ H04W 12/0602 |
| 2017/0070923 A1 | 3/2017 | Li et al. |
| 2017/0251412 A1 | 8/2017 | Xu et al. |
| 2017/0273134 A1 | 9/2017 | Cao et al. |
| 2018/0035334 A1 | 2/2018 | Lohar et al. |
| 2018/0041927 A1 | 2/2018 | Raval et al. |
| 2018/0145739 A1* | 5/2018 | Sivasivaganesan .... H04B 7/024 |
| 2019/0297540 A1 | 9/2019 | Das et al. |

FOREIGN PATENT DOCUMENTS

| | | |
|---|---|---|
| KR | 101296578 B1 | 8/2013 |
| WO | 2010068154 A1 | 6/2010 |
| WO | 2013107346 A1 | 7/2013 |
| WO | 2013153128 A2 | 10/2013 |
| WO | 2013189443 A2 | 12/2013 |
| WO | 2014069954 A1 | 5/2014 |
| WO | 2016141964 A1 | 9/2016 |
| WO | WO-2018104769 A1 * | 6/2018 |

OTHER PUBLICATIONS

PCT International Search Report for PCT/US18/12852.
Third Generation Partnership Project, "3rd Generation Partnership Project; Technical Specification Group Radio Access Network; Evolved Universal Terrestrial Radio Access Network (E-UTRAN); X2 General Aspects and Principles (Release 13)", 3GPP TS 36.420 V13.0.0 (Dec. 2015).
Third Generation Partnership Project, "3rd Generation Partnership Project; Technical Specification Group Radio Access Network; Evolved Universal Terrestrial Radio Access Network (E-UTRAN); X2 Application Protocol (X2AP) (Release 13)", 3GPP TS 36.423 V13.1.0 (Sep. 2015).
Third Generation Partnership Project, "3rd Generation Partnership Project; Technical Specification Group Radio Access Network; Evolved Universal Terrestrial Radio Access Network (E-UTRAN); X2 Layer 1 (Release 13)", 3GPP TS 36.421 V13.0.0 (Dec. 2015).
Third Generation Partnership Project, "3rd Generation Partnership Project; Technical Specification Group Services and System Aspects; Architecture Enhancements for Non-3GPP Accesses (Release 13)", 3GPP TS 23.402 V13.2.0 (Jun. 2015).
Third Generation Partnership Project, "3rd Generation Partnership Project; Technical Specification Group Core Network and Terminals; Access to the 3GPP Evolved Packet Core (EPC) via non-3GPP Access Networks; Stage 3 (Release 12)", 3GPP TS 24.302 V12.9.0 (Jun. 2015).
Third Generation Partnership Project, "3rd Generation Partnership Project; Technical Specification Group Core Network and Terminals; Access Network Discovery and Selection Function (ANDSF) Management Object (MO) (Release 13)", 3GPP TS 24.312 V13.3.0 (Jun. 2016).
Telefonaktiebolaget L M Ericsson, Alcatel-Lucent S A, "SCTP Concentrator: A Simple Solution to a Debated Problem," 3GPP TSG-RAN WG3 #75, Agenda Item: 15.1.3, R3-120321, Feb. 6-10, 2012, Dresden, Germany.
Y.C. Lee, DR. Harrison Jangwoo Son, "SMEC's LTE Femto Gateway with X2 Broker—Facilitating Instant Mass Deployment of LTE Femtocells in Existing LTE Infrastructure," SMEC White Paper, Mar. 2016.
"Restructuring of X2 GW Proxy Section", 3GPP TSG-RAN Meeting #80, Change Request, 37.803 CR 0006, Version 11.1, May 20-24, 2013, Fukuoka, Japan.

* cited by examiner

X2 BROKERING WITH AGGREGATION OPTIMIZATION

CROSS-REFERENCE TO RELATED APPLICATIONS

This application claims the benefit under 35 U.S.C. § 119(e) of U.S. Provisional App. No. 62/443,486, titled "X2 Brokering with Aggregation Optimization," and filed Jan. 6, 2017, which is hereby incorporated by reference herein in its entirety. This application also hereby incorporates by reference in their entirety for all purposes U.S. Pat. Pub. No. US20140133456, titled "Dynamic Multi-Access Wireless Network Virtualization" and published May 15, 2014, and U.S. Pat. Pub. No. US20150257051, titled "Federated X2 Gateway" and published Sep. 10, 2015. Additionally, the following documents are hereby incorporated by reference in their entirety for all purposes: U.S. patent application Ser. No. 15/721,728, titled "Handovers with Simplified Network Topology"; U.S. patent application Ser. No. 15/782,819, titled "X2 Brokering Between Inter-3GPP Release eNodeB's"; U.S. Pat. Pub. No. US20170273134A1, titled "IuGW Architecture"; and U.S. Pat. Pub. No. US20160044531A1, titled "Congestion and Overload Reduction" by analogy for X2 instead of S1.

BACKGROUND

The X2 interface and X2 application protocol (referred to herein as the X2 protocol or X2AP) are a defined interface and protocol for providing point-to-point communications between two eNodeBs within a Long Term Evolution (LTE) radio access network. The X2 interface supports the exchange of signaling information and also supports the forwarding of packets from one eNodeB to another eNodeB via a tunnel. The X2 interface is defined and specified in various 3GPP technical specifications, such as 3GPP TS 36.420, hereby incorporated by reference. The X2 interface is used by the X2 application protocol, which supports many applications, including mobility management (e.g., handovers); load management; reporting of general error situations; resetting X2; setting up X2; and eNB configuration updates. The X2 application protocol is defined and specified in 3GPP TS 36.423, hereby incorporated by reference. The following 3GPP technical specifications are hereby incorporated by reference: TS 36.423; TS 36.420; TS 36.421; TS 23.402; TS 24.302; and TS 24.312, dated as of the priority date of this application. The X2 application protocol has largely been adopted by the 3GPP as a standard for the upcoming 5G network technology as well, in particular for interfacing with 4G/LTE technology, and is complemented by 5G-specific standard protocols called Xn.

SUMMARY

In one embodiment, a method may be disclosed, comprising: associating a first base station with a first base station identifier at a signaling protocol gateway, the signaling protocol gateway providing gateway services for a control plane signaling protocol between base stations, and with a first Internet Protocol (IP) address of the signaling protocol gateway; associating a second base station with a second base station identifier at the signaling protocol gateway, and with a second IP address of the signaling protocol gateway; establishing a first signaling protocol connection between a third base station and the first base station via the signaling protocol gateway with the first base station using the first IP address of the signaling protocol gateway; and establishing a signaling protocol connection between the third base station and the second base station with the second base station using the second IP address of the signaling protocol gateway.

The signaling protocol gateway provides stateful proxying of the signaling protocol connection, thereby enabling the third base station to establish a connection to the first and the second base station via the signaling protocol gateway without an IP address of the first base station and an IP address of the second base station. The control plane signaling protocol between base stations may be an X2 or Xn protocol, the first base station identifier may be an extended cell global identifier (eCGI), and the first base station may be an eNodeB or gNodeB.

The method may further comprise associating the third base station with a third base station identifier and a third IP address of the signaling protocol gateway, associating a fourth base station with a fourth base station identifier and a fourth IP address of the signaling protocol gateway, establishing a signaling protocol connection between the first base station and the third base station using the third IP address of the signaling protocol gateway, and establishing a signaling protocol connection between the first base station and the fourth base station using the fourth IP address of the signaling protocol gateway, thereby enabling the first base station to establish a connection to the third and the fourth base station via the signaling protocol gateway without an IP address of the third base station and an IP address of the fourth base station.

The method may further comprise the signaling protocol gateway providing a single gateway for establishing a plurality of signaling protocol connections with a plurality of virtualized base stations. The method may further comprise the signaling protocol gateway performing brokering of X2 connections between the first and the second base station via an IP address of the signaling protocol gateway. The first base station identifier may be the second base station identifier. The first base station identifier and the second base station identifier may be cell global identifiers (CGI) or extended CGI (eCGI) identifiers and the first base station identifier and the second base station identifier differ in their lower eight bits. The method may further comprise the signaling protocol gateway receiving requests from the first or second base station at a first network interface, and sending responses to the third base station using a second network interface. The method may further comprise the signaling protocol gateway multiplexing multiple signaling protocol connections over a single stream control transmission protocol (SCTP) connection.

The method may further comprise assigning IP addresses at the signaling protocol gateway from a pool of IP addresses, and associating the assigned IP addresses with base station identifiers, and translating the associated IP addresses to and from the base station identifiers. The method may further comprise receiving, at the signaling protocol gateway, a message from the first base station for the third base station, rewriting the message to indicate the first IP address of the signaling protocol gateway as a source IP address, and sending the message to the third base station. The method may further comprise advertising the first and second IP addresses of the signaling protocol gateway for the first base station and the second base station to the third base station. The method may further comprise receiving a first message from the first base station, receiving a second message from the second base station, and proxying the first message but not the second message to the third base station.

DETAILED DESCRIPTION

X2AP protocol allows offloading the Handover load from the EPC core and concentrates that on the individual eNBs across which the handover needs to be performed. But it also enforces a mesh based network architecture which is difficult to maintain if the network consists of large number of small cells. The Parallel Wireless X2 broker (HNG) alleviates this issue by aggregating and abstracting the small cells, applying an optimization technique which maintains the semantics of the X2AP protocol.

As used herein, HNG refers to the Parallel Wireless HetNet Gateway, which is a multifunctional network node situated between the radio access network (RAN) and core network (CN), and which may perform a number of other functions in addition to the X2 brokering functionality described herein. Features, structures, characteristics, functions, modules, and portions of any of the described hardware and software in this document and in all referenced documents may be combined or separated in any order or fashion. The embodiments described herein may be performed on the hardware identified in the referenced documents.

Small cells are increasingly being used to fill up the coverage/connectivity holes in the EPS network by the operators due to their easy installation and extend-ability. Since, small cells by definition cover a smaller area, a lot more of them are required to provide required overall coverage. Larger number of small cells in turn translates into large signaling load to the EPC core especially due to UE mobility and session management procedure like S1 based Handover. The S1 HO is routed via the MME.

Figure 1:
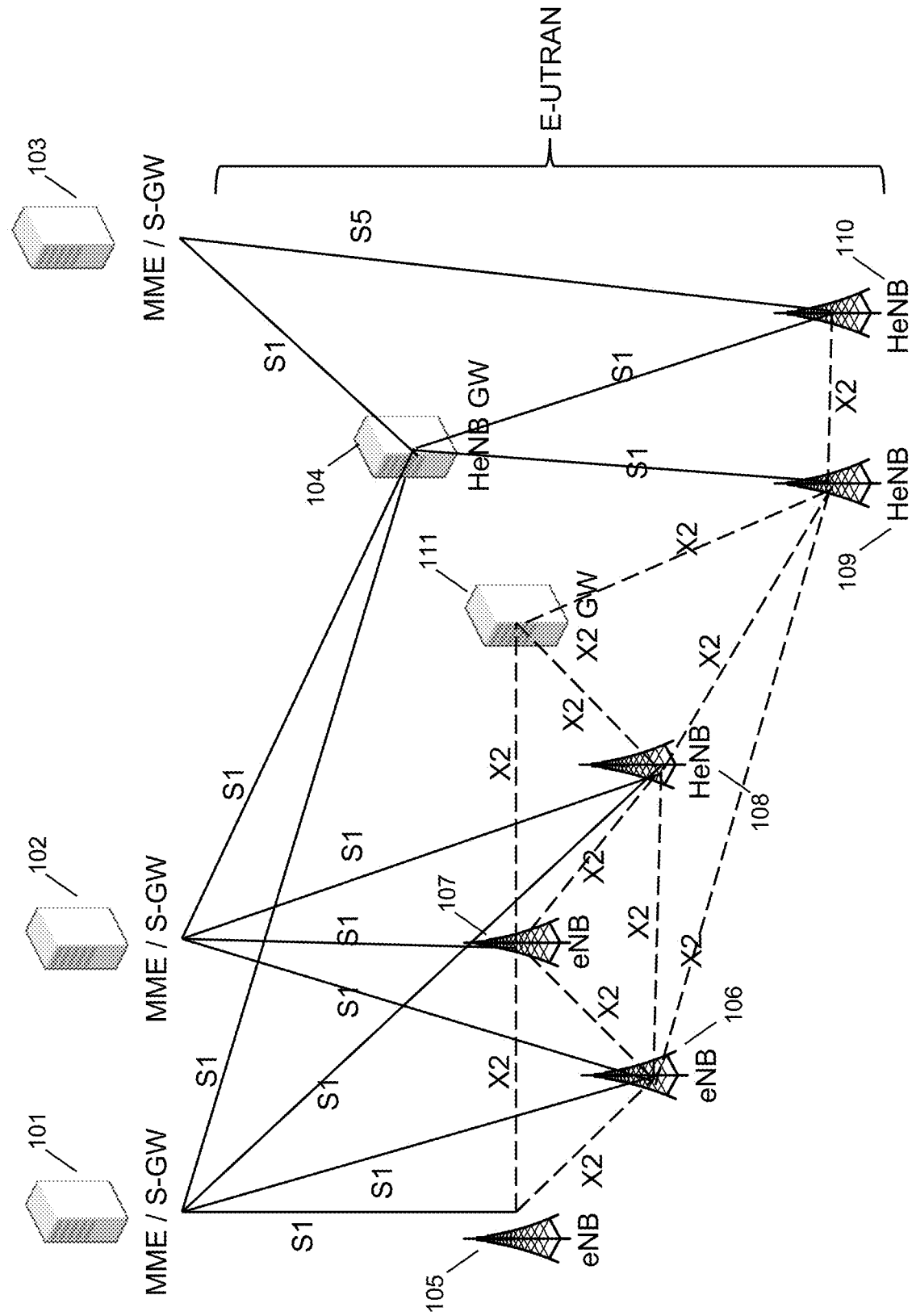
FIG. 1 is an architecture diagram of a 3GPP wireless network, in accordance with the prior art.

In order to relieve the EPC from the HO load, X2AP protocol was developed so that the eNBs can directly communicated with each other over the X2 link and perform X2 based HO, updating the core (MME) with the UEs location only when the X2 HO has successfully completed. The X2 links/associations between the eNBs can be pre-created based on configuration which uses knowledge of the network topology. It can also be created dynamically via TNL (Transport network layer) discovery procedure over S1 via the EPC core. The source eNB discovers the X2 endpoint of the target eNB via the TNL discovery procedure. FIG. 1 shows a typical 3GPP defined network architecture with X2 and S1 links.

FIG. 1 is an architecture diagram of a 3GPP wireless network, in accordance with the prior art. In some embodiments, the problem as shown is as follows. As apparent in FIG. 1, each small cell needs to individually connect to the other small/macro cell with which it needs to create an X2 association. This leads to a mesh like network architecture which is very difficult to maintain and scale considering the large number of small cells that need to be deployed.

Several nodes in the Evolved Packet Core (EPC), including mobility management entity (MME) 101, MIME/serving gateway (S-GW) 102, and MME/S-GW 103 are located in a core network. Where shown in the present disclosure it is understood that an MME/S-GW is representing any combination of nodes in a core network, of whatever generation technology, as appropriate. A gateway node, labeled Home eNB (HeNB) GW 104, is shown in a gateway role and position between the EPC and the radio access network (RAN). Another gateway node, labeled X2 GW 111, is shown in a gateway role for the X2 protocol among a series of base stations. The RAN shown is an evolved universal mobile telecommunications system terrestrial radio access network (E-UTRAN), for 4G/LTE, and is shown with multiple included base stations, including eNodeBs 105, 106, 107 and multiple home eNodeBs 108, 109, 110. Where HeNBs are mentioned in the present disclosure, the term should be understood to include other equivalents, which depending on context may include regular eNBs, femto cells, small cells, virtual cells, virtualized cells (i.e., real cells behind a virtualization gateway), or other cellular base stations, including 3G base stations and 5G base stations (gNBs).

Figure 2:
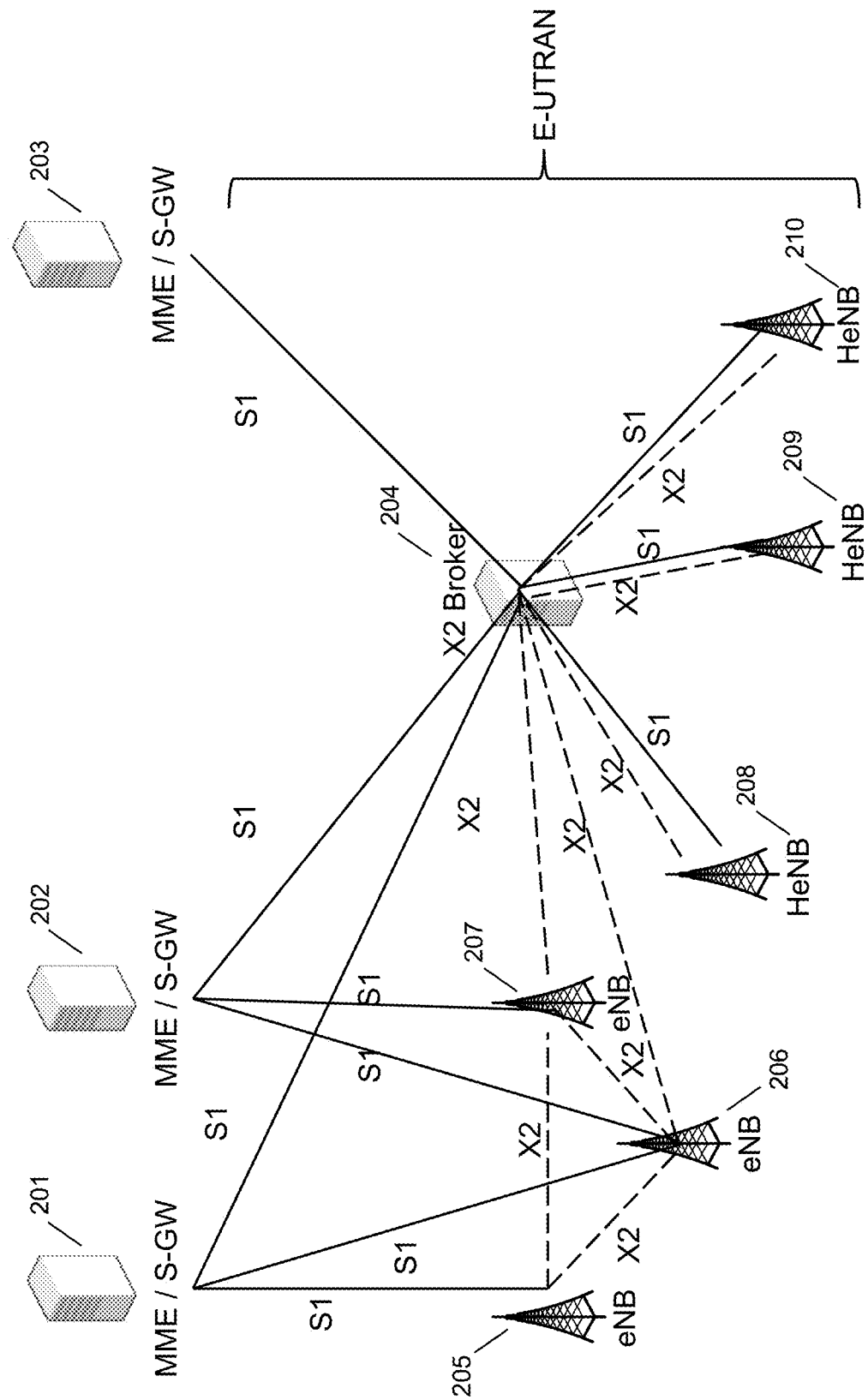
FIG. 2 is an architecture diagram of a wireless network, in accordance with some embodiments.

As shown, each base station (eNB, HeNB) is coupled to each other base station with its own X2 connection. In some instances, what is needed is what is depicted in FIG. 2 below—a single X2 broker aggregating a large number of small cells with each small cell creating a single X2 association with the X2 broker. This single link/association should suffice for all possible Macro-eNBs and other small cells not aggregated by X2 broker. But 3GPP X2 protocol, doesn't allow for that. X2AP assumes a single X2 link uniquely identifies a pair of X2 associated nodes, i.e., an eNB can't use the same X2AP association to connect to multiple peer eNBs, even when it is connected to an aggregating entity like an X2 broker. So, even though the X2 broker node is absolutely needed in order to simplify the network, the X2AP protocol definition proves to be a bottleneck for the same, and instead a large number of nodes and the resulting bookkeeping are required.

It should also be noted that even in the presence of a prior art X2 broker 111, there is further need of optimization. If there are large number of small cells deployed on the network/core side of X2 broker, they also need to be aggregated/abstracted so that the X2 links remain manageable. Then there is the question of X2AP interaction between nodes aggregated by X2 broker which also need to avoid the mesh architecture.

Also, the 3GPP release 12 definition of X2GW solves the transport layer issue where the same lower-layer stream control transmission protocol (SCTP) connection can be used to connect to multiple X2AP peers via a X2GW. But it doesn't solve the connection issue at the X2AP protocol level. Please also note that a vast majority of small cells are expected to still be pre-release 12 compliant for many years to come. So, this creates an issue with this solution.

FIG. 2 is an architecture diagram of a wireless network, in accordance with some embodiments. An exemplary Single Association X2 Brokering is shown. MME/S-GWs 201, 202, and 203 are shown in communication with X2 broker/gateway 204 via the S1 protocol. X2 broker 204 plays an X2 brokering role for all X2 communications to and from each node it manages, specifically: HeNB 208; HeNB 209; HeNB 210. X2 broker 204 also manages S1 connections for those nodes. By contrast, un-enhanced base stations 205, 206, 207 still require an S1 connection to each MME/S-GW (e.g., to each core network). As well, each managed/enhanced base station (HeNBs 208, 209, 210) do not need an X2 connection with each other, as these communications are handled via the X2 broker. It is understood that HeNB and eNB are meant to represent enhanced and non-enhanced nodes; the un-managed eNBs may also be referred to herein as macro eNodeBs or macro base stations or third-party base stations or non-self-organizing network managed (non-SON managed) cells. Aspects of the present disclosure may be referred to as SON functionality (the management functions described herein) or virtualization functionality, in some embodiments. The word "virtualization" may also be understood to be synonymous with "aggregation," in appropriate situations herein (e.g., when multiple cells are being made visible or being advertised as a single cell).

As well, X2 communications between an eNodeB and an HeNB are managed through the X2 broker 204. The X2 broker acts to virtualize the HeNBs such that it represents itself to the other eNBs as a single peer eNB, even though it actually handles multiple HeNBs. The underlying HeNBs are addressed directly as described below.

In some embodiments, the following solutions are presented to the above problem. There are at least two significant issues to solve here: 1. Simplifying the mesh network architecture required by X2AP network architecture; and 2. Adhering to the X2AP semantics of one SCTP transport per X2 peer while simplifying the network. The Parallel Wireless X2 broker (HNG or HetNet Gateway), solves the problems mentioned above in a unique fashion.

Solution to Issue 1—Simplifying Mesh Architecture

Regarding the first issue, the crux of the solution lies in applying aggregation based on the 20 bits prefix of the Global-eNB-ID of the small cells irrespective of the direction. This means that all small cells sharing the 20 bit prefix on the access side would be logically advertised as a single Macro-eNB to the network/core side Macro or small cells. The individual aggregated small cells on the access side would be specified as served cells of the logical Macro node, say Macro-eNB-A.

Similarly, in the opposite direction, small cells on the network side of HNG are aggregated based on common 20 bit prefix in the Global-eNB-ID. These small cells are then advertised as served cells of a logical Macro eNB to the access side nodes of HNG, say Macro-eNB-B.

So, 256 small cells can be aggregated at Macro-eNBs in either direction. Here, the individual small cells create a single X2AP connection to the X2 broker irrespective of the direction. Thus, 256 X2AP access side connections for Macro-eNB-A are created with HNG (pertaining to X2 peer Macro-eNB-B). Likewise, 256 X2AP core side connections for Macro-eNB-B are created with HNG (pertaining to X2 peer Macro-eNB-A). So, overall X2AP 512 connections are created via HNG acting as X2 broker. This is a huge saving when compared to the 65536 X2AP associations that would need to be created in a meshed architecture.

Further, the 256 small cells on the access side, aggregated by Macro-eNB-A, need not create individual 32640 X2AP associations with each other. They can each have just one X2 association with the HNG with HNG advertising rest of the aggregated 255 small cells as served cells of Macro-eNB-C. Again, a huge saving in the number of X2AP connections.

Figure 3:
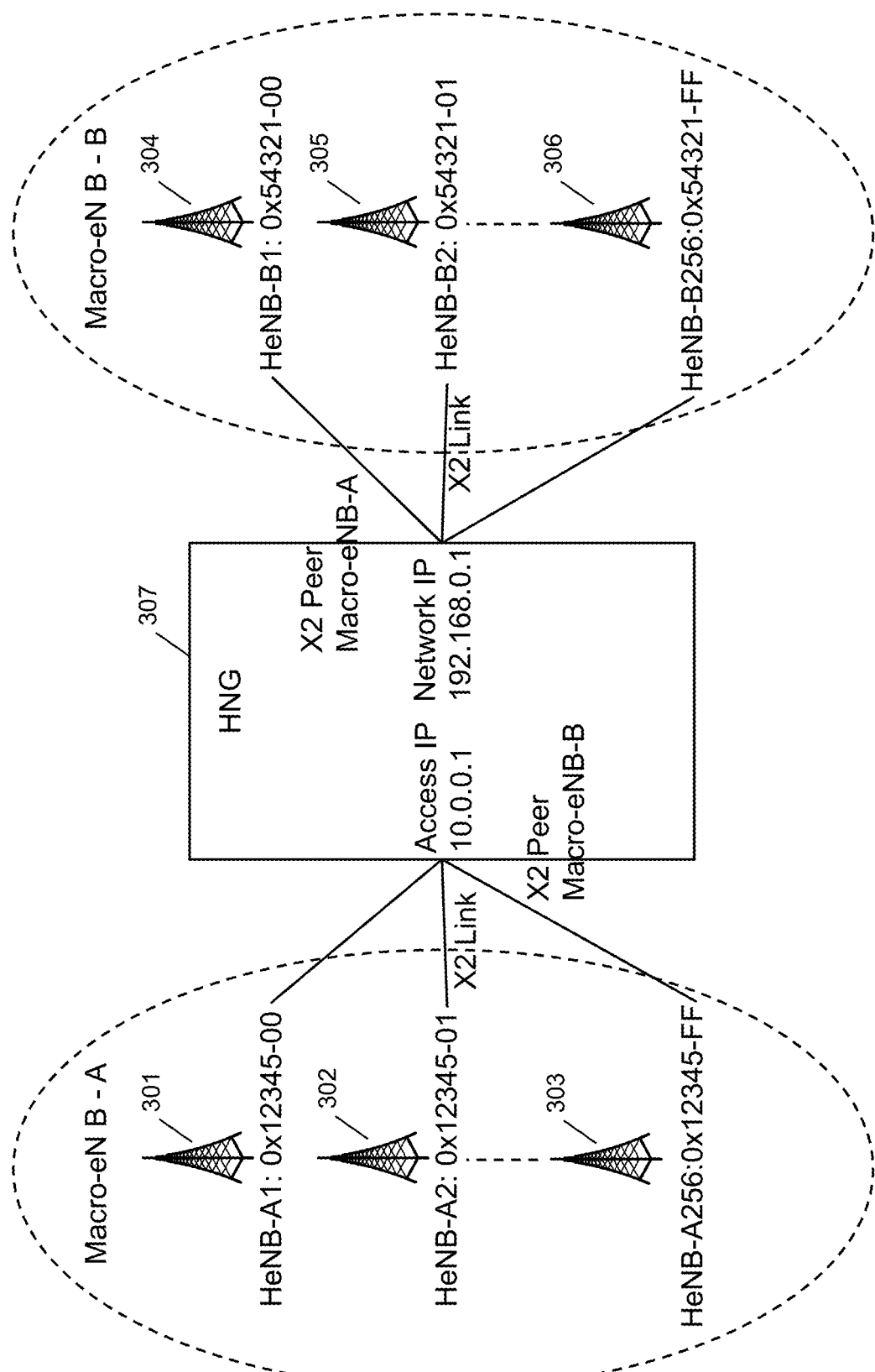
FIG. 3 is a schematic diagram of X2 connections in a wireless network, in accordance with some embodiments.

FIG. 3 is a schematic diagram of X2 connections in a wireless network, in accordance with some embodiments. X2 mesh simplification is shown in the figure. Parallel Wireless HetNet Gateway [TM], or another gateway enhanced with X2 brokering as described herein, sits between the first access network ("labeled "access IP") and the second access network (labeled "network IP"). The first access network, including base stations 301, 302, 303, or any number of base stations, is managed by SON and virtualized (e.g., managed cells) and may be macro cells, small cells, etc. The second access network (cells 304, 305, 306) is non-SON managed or third party cells. Aggregation of non-SON managed small cells is performed at the gateway 307 toward the managed small cells and vice versa. In each case, the X2 links are set up between the HNG 307 and the cells. Each cell's cell ID is shown in the figure, with the last two hexadecimal digits indicating the lower 8 bits of the cell ID ("00, 01, FF"). For a cell on one side of the gateway, it may access the gateway as a proxy, and the gateway will virtualize all of the cells on the other side of the gateway (up to 256 nodes) as a single eNodeB and will assign IPs and perform network address translation and proxying and silencing/suppressing to enable the desired semantics.

Solution to Issue 2—Maintaining X2AP Semantics

One key aspect of the solution lies in using one IP address per Macro-eNB (non-aggregated node) on the access side. A couple of solutions are described below.

Solution 1—One IP Per Macro-eNB on Access Side

The HNG aggregates the small cells via S1 links acting as, essentially, a HeNBGW for the small cells. But it also proxies the Macro-eNBs and other non-aggregated small cells towards the small cells over the X2 interface. So, when an aggregated small cell initiates a TNL discovery procedure for a target cell (e.g. of Macro-eNB), the HNG allocates an access side IP address specifically for the Macro-eNB (e.g., HNG-IP1) for that small cell and answers/completes the TNL discovery procedure itself. So, the aggregated small cell essentially sees the access side HNG IP as the Macro-eNB endpoint. It then initiates the X2 association setup using this as the target IP. The HNG then proxies the X2 Setup between the aggregated small cell and Macro-eNB. It should be noted that the Macro-eNB only sees HNG core side X2 endpoint as the X2 peer (small cell) endpoint. The same applies again if the aggregated small cell tries to discover another Macro-eNB. Only this time, HNG allocates a different access side IP address (e.g. HNG-IP2). Rest of the procedure remains the same. So, this ensures that for an aggregated small cell, individual X2 endpoints are created by HNG dynamically per Macro-eNB (non-aggregated eNB) thus conforming to the X2AP protocol.

Figure 4:
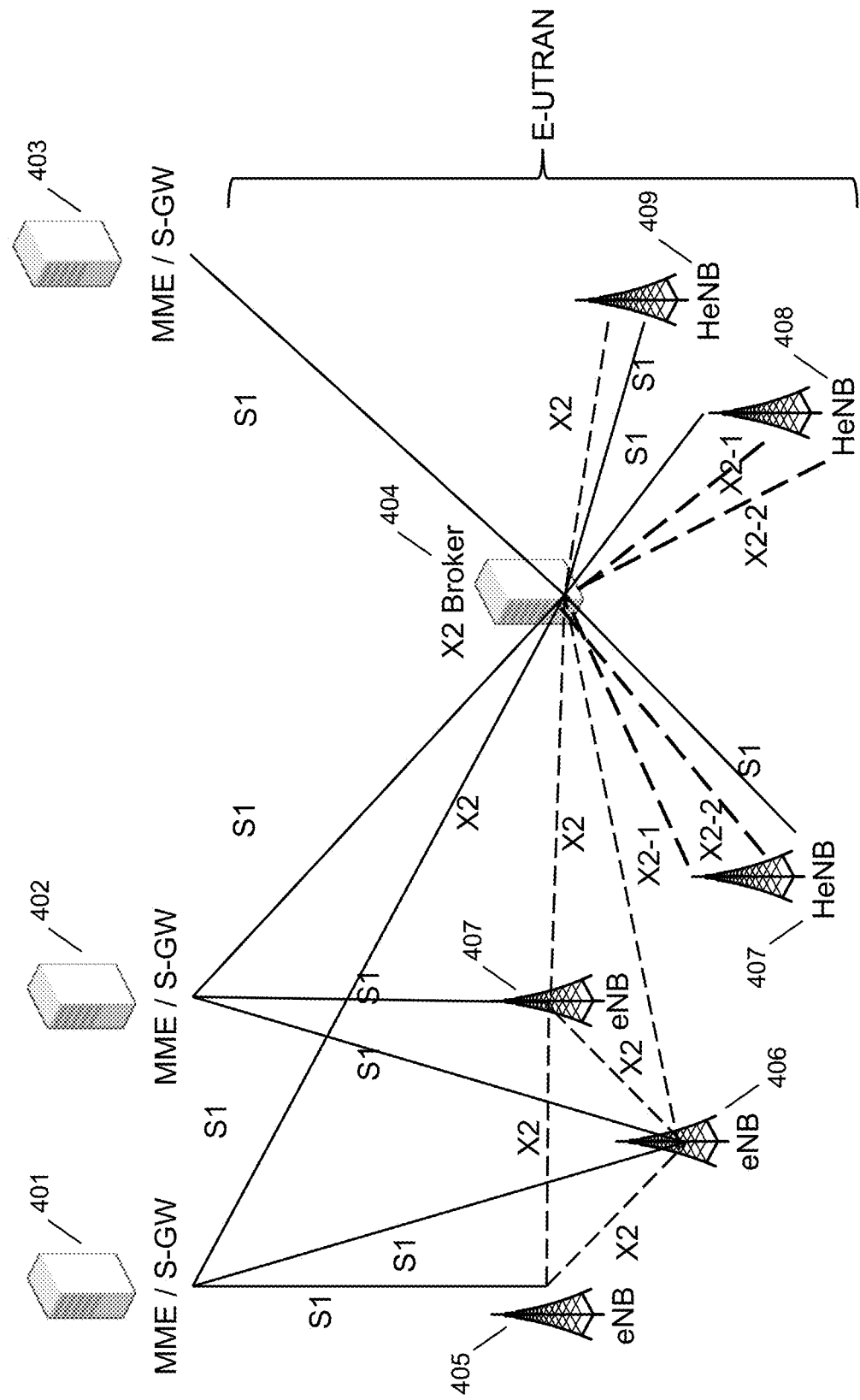
FIG. 4 is an architecture diagram of a wireless network showing X2 brokering with IP optimization, in accordance with some embodiments.

FIG. 4 is an architecture diagram of a wireless network showing X2 brokering with IP optimization, in accordance with some embodiments. MME/S-GW 401, 402, 403 are shown, as well as X2 broker 404, unmanaged eNodeBs 405, 406, 407 and managed/brokered HeNodeBs 407, 408, 409.

In FIG. 4, HeNB1 407 establishes individual X2 associations with X2 broker when trying to connect to eNB-1 and eNB-2 respectively. Same applies to HeNB-2 408. But it should be noted that the Macro eNBs (eNB1 406 or eNB2 407) still creates a single X2 association with the X2 broker 404 even when it is supposed to connect to both HeNB-1 and HeNB-2 as shown in FIG. 4. The X2 broker advertises both HeNB-1 and HeNB2 as its served cells to the Macro-eNBs.

This simplifies the EPC with respect to the X2 connections while maintaining the semantics of the X2 protocol.

The methodology above assumes that the X2 broker supports multiple IPs on the access side per small cell. The number of IPs is directly proportional to the number of Macro-eNBs that the small cell intends to connect to. The X2 broker implemented by PW-HNG, solves this issues as well by allowing the reuse of IP address across multiple aggregated small cells. So, in FIG. 4 below, the HNG can advertise the same IPs, HNG-IP1 and HNG-IP2, for creating X2 association towards eNB-1 and eNB-2 for both HeNB-1 and HeNB-2. Or, it can advertise the same IPs, HNG-IP1 and HNG-IP2, to HeNB-2 in order to connect to completely different set to eNBs, eNB-3 and eNB-4. So, essentially the access side IPs of the HNG have no co-relation across small cells that they are serving. The only condition being the set of IPs contains one unique IP per Macro-eNB per small cell.

Further, the set of IPs used by X2 broker can be privately managed since X2 broker terminates the X2 associations with small cells that it aggregates.

Solution 2—One Port Per Macro-eNB on Access Side

Instead of using different IP for each Macro, different port should also suffice to differentiate SCTP association between access side small cells and multiple Macro-eNBs. So, the X2 broker should advertise one unique port per Macro-eNB to the small cell along with the IP during the TNL discovery process. In this case, the X2 broker keeps the IP address same on the access side. So, all small cells connect to the same access side IP of the X2 broker, for all Macro-eNBs on the core side. Again, the access side ports of the X2 broker have no co-relation across small cells that they are serving. The only condition being the set of ports contains one unique port per Macro-eNB per small cell.

In FIG. 4, the SCTP associations for X2 Setup should be created based on separate ports rather than separate IPs of X2 broker for X2-1 and X2-2.

Please note that the 3gpp specs mandate that only port 36422 be used for X2AP and there is no option to communicate using other SCTP port for X2 setup according to the standard. Hence this approach may involve non-standards-based embodiments and/or changes on eNB's. Also, the TNL discovery procedure may be modified to allow for ports to be advertised. Currently, only the IPs can be advertised by the target eNB.

Call Flows illustrating the above systems and methods follow.

Figure 5:
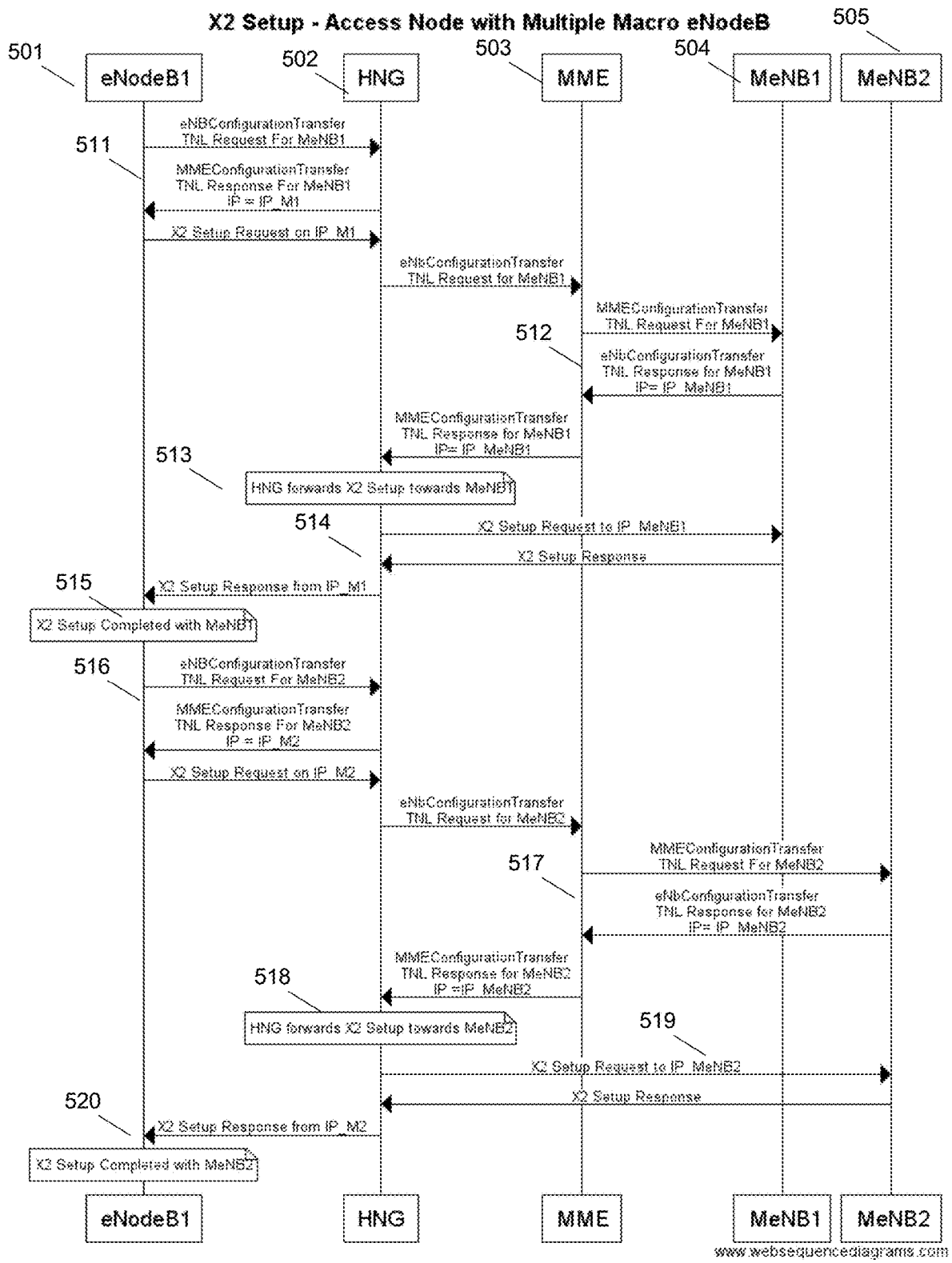
FIG. 5 is a call flow showing X2 setup of an access node with multiple macro eNodeBs, in accordance with some embodiments.

FIG. 5 is a call flow showing X2 setup of an access node with multiple macro eNodeBs, in accordance with some embodiments. eNB 1 501, HNG 502, MME 503, MeNB 1 and MeNB 2 are shown.

At 511, eNB 501 sends a configuration request and setup request intended for MeNB 1. The HNG figures out the appropriate destination based on the IP address in the X2 setup request and completes the flow 512 (configuration transfer), 513 (forward X2 setup request to MeNB1), 514 (X2 setup request between HNG and MeNB1, with HNG and MeNB1 as endpoints). Only then does it complete the requested X2 connection 515, which has as endpoints the HNG itself and the requesting eNB1. Steps 516, 517, 518, 159, 520 show eNB1 setting up a separate X2 connection with MeNB2 505.

Salient points of the call flow include the following: 1. HNG advertises different IPs IP_M1 and IP_M2 on access side to eNodeB1 for MeNB1 and MeNB2 respectively; and 2. HNG proxies the X2 Setup request advertising eNodeB1 as served cell to both MeNB1 and MeNB2.

Figure 6:
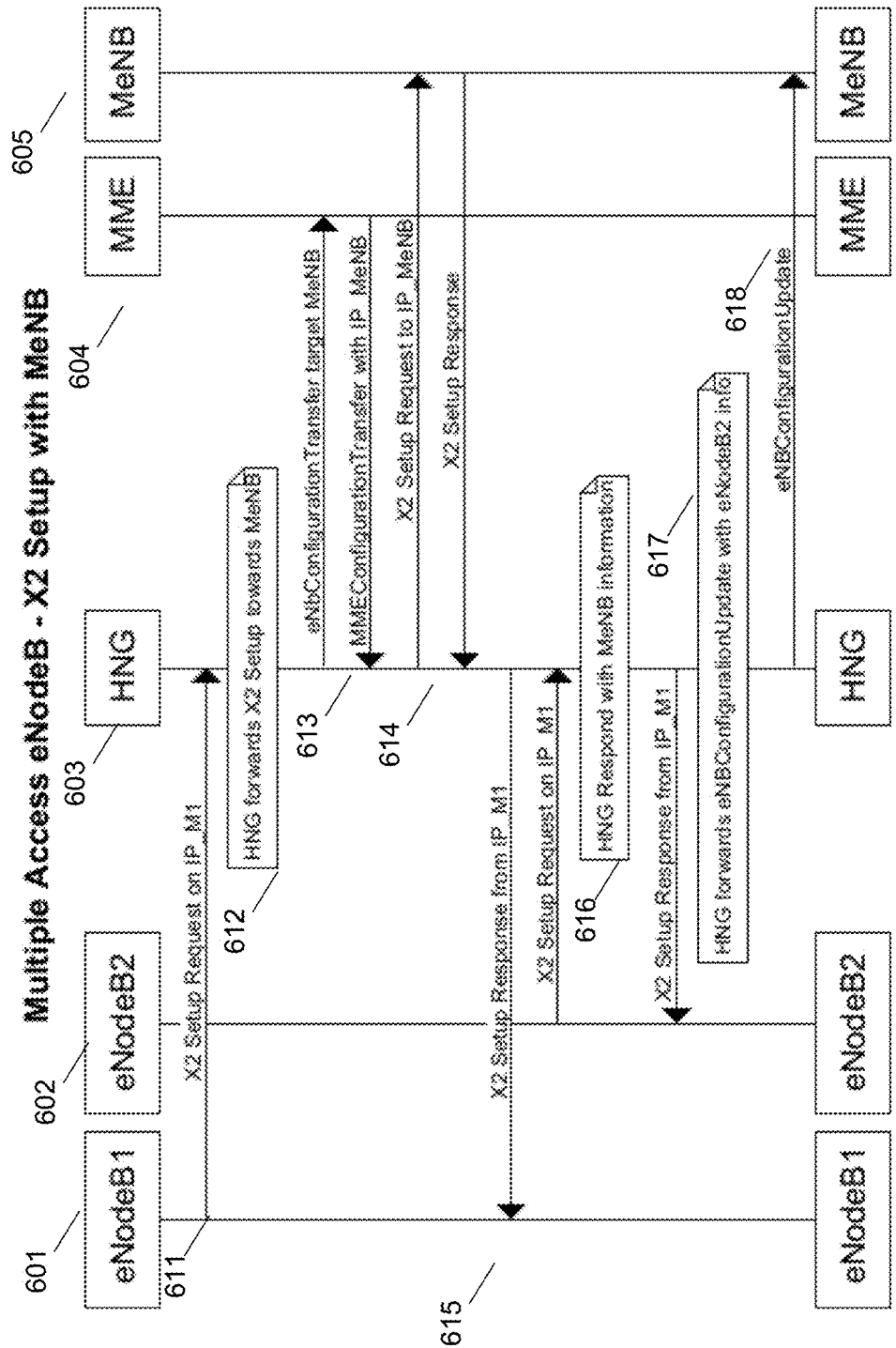
FIG. 6 is a call flow showing X2 setup of multiple eNodeBs associating with a single macro eNodeB, in accordance with some embodiments.

FIG. 6 is a call flow showing X2 setup of multiple eNodeBs associating with a single macro eNodeB, via an X2 broker, in accordance with some embodiments. eNodeB1 601, eNodeB2 602, Parallel Wireless HetNet Gateway (HNG) providing X2 functionality 603, MME 604 and macro eNodeB 605 are shown. At step 611, eNB 1 requests X2 setup. As it is sent on IP IP_M1, the HNG knows to forward it to MeNB at step 612. At step 613, eNB configuration transfer is performed, with the HNG and the MeNB as the endpoints. At step 614, an X2 setup is performed, with the HNG and the MeNB as the endpoints. At step 615, the X2 setup response is sent from the HNG to eNB 1, with IP_M1 as the source IP address. At step 616, an X2 setup request is sent from eNB 2, and the HNG does not reach back out to the MeNB but instead responds immediately and sets up the X2 connection, as from the viewpoint of MeNB 605, a connection already exists between the HNG and the MeNB. At step 617, eNB 2 info is forwarded to the MeNB. At step 618, this is received by MeNB.

Salient points of the call flow include the following: 1. HNG advertises same IP, IP_M1, on access side to both eNodeB1 and eNodeB2 for MeNB; 2. HNG proxies the X2 Setup request advertising eNodeB1 as served cell to MeNB; 3. HNG send an X2 eNB configuration update message to add eNodeB2 to its served cell list towards MeNB. There is only single X2 link used between and HNG and MeNB.

Figure 7:
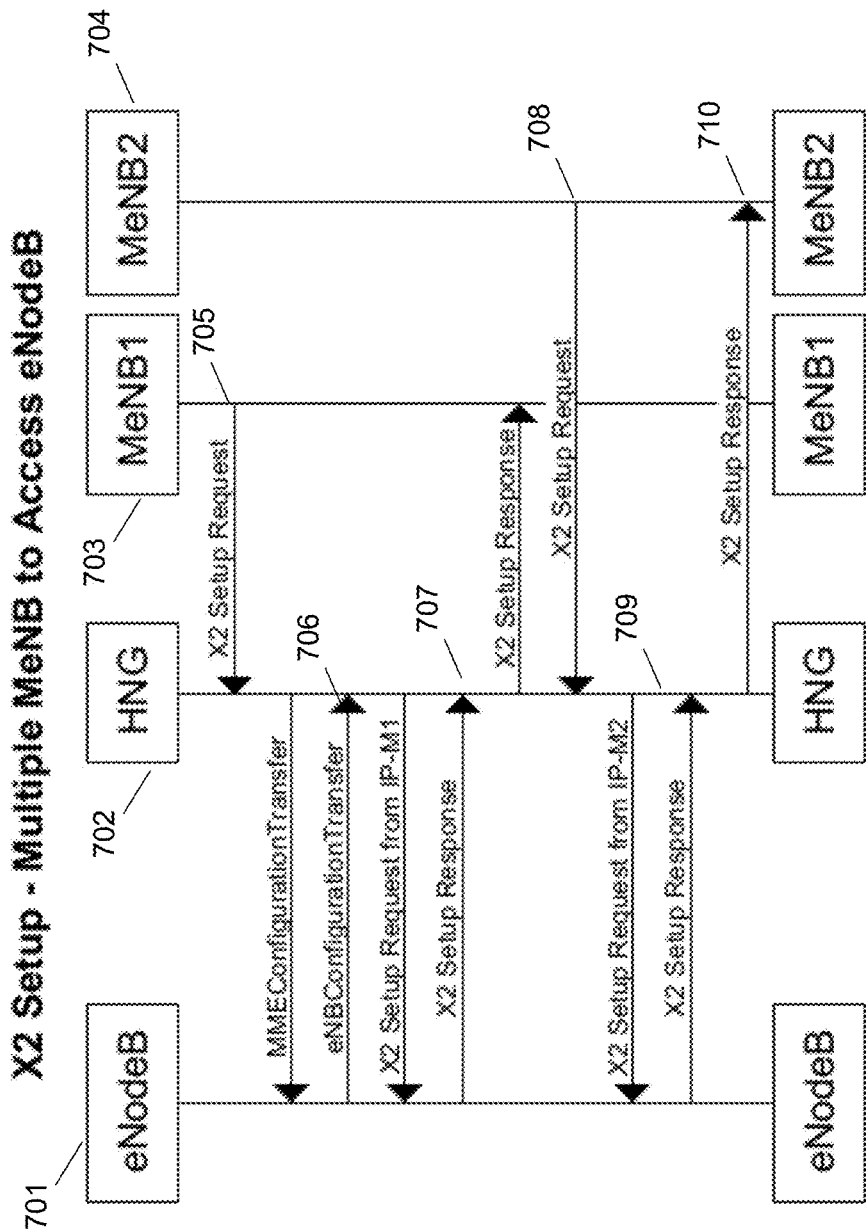
FIG. 7 is a call flow showing X2 setup of multiple macro eNodeBs to an access node, in accordance with some embodiments.

FIG. 7 is a call flow showing X2 setup of multiple macro eNodeBs to an access node, including multiple macro eNBs associating with a single eNB via a X2 broker, in accordance with some embodiments. eNodeB 701, HNG 702, and two MeNBs 703 and 704 are shown. At step 705, an X2 setup request is sent from MeNB1 to HNG 702, which identifies which eNB (here, eNB 701) is the desired target. The HNG performs the configuration transfer at 706. At step 707, the HNG sets up the X2 configuration with the eNB 701, and only then does it set up the X2 connection with the MeNB 1. A second X2 setup request flow 708, X2 setup request and response 709, and setup response 710 are shown for MeNB 2; the source IPs of setup requests 706 and 709 are based on the source MeNBs.

Salient points of the call flow include the following: 1. HNG initiates SCTP/X2 Setup towards eNodeB using unique source IPs for MeNB1 and MeNB2, IP_M1 and IP_M2.

Figure 8:
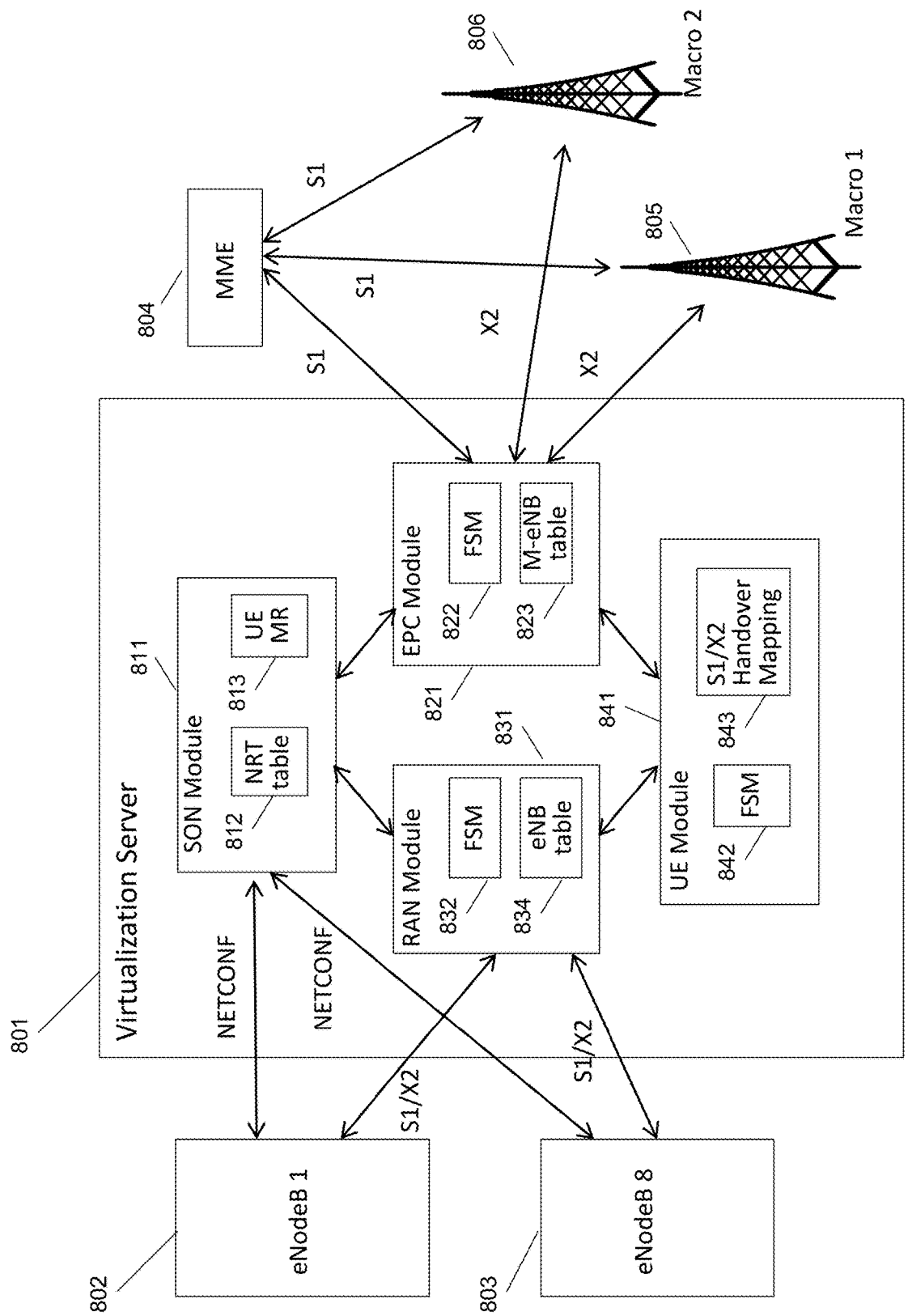
FIG. 8 is a schematic diagram of an X2 brokering server, in accordance with some embodiments.

FIG. 8 is a schematic diagram of an X2 brokering server, in accordance with some embodiments. X2 brokering server 801 provides services to, and is coupled to, eNodeB 1 802 and eNodeB 8 803, on a RAN side of a network (i.e., inside of the gateway). X2 brokering server 801 provides services to, and is coupled to, MME 804, macro eNodeB 805, and macro eNodeB 806, on a core network side of the network (outside of the gateway). X2 brokering server 801 corresponds to LAC 110, in some embodiments.

Within X2 brokering server 801 are self-organizing network (SON) module 811, containing neighbor relation table (NRT) 812 and UE measurement report processing module 813; evolved packet core (EPC) module 821, containing EPC finite state machine module 822 and macro eNodeB table 823; radio access network (RAN) module 831, containing eNodeB finite state machine module 832 and eNodeB table 834; and user equipment (UE) module 841, containing UE finite state machine module 842 and S1/X2 handover mapping table 843. In some embodiments, SON module 811 may perform NRT maintenance, load information processing and fractional frequency reuse (FFR) processing; RAN module 831 may perform X2 association management with eNodeBs 802, 803; EPC module 821 may perform X2 association management with macro eNodeBs 805, 806; and UE module may perform X2 handover and S1/X2 translation between eNodeBs 802, 803 and macro eNodeBs 805, 806. Finite state machine modules 822, 832, 842 may include one or more states for modeling the operational state of a connected EPC, UE, or RAN, respectively. More than one FSM may be present at each of modules 821, 831, 841, so that X2 brokering server 801 may be enabled to model the operational state of several network nodes at once. All the above managers/modules interact with each other to accomplish the assigned functionality.

In some embodiments, X2 brokering server 801 may include one or more processors, each with one or more processor cores. Each of modules 811, 821, 831, and 841 are coupled to each other within X2 brokering server 801, and may execute on one or more shared processors (not shown) coupled with memory (not shown). X2 brokering server 801 may include a real-time operating system, such as a Linux operating system, and may include an operating system that distributes tasks among multiple cores. X2 brokering server 801 may provide one or more of modules 811, 821, 831, 841 as processes, threads, user-mode or kernel-mode processes, processes in hardware or in software, in some embodiments. In some embodiments, each of modules 811, 821, 831, 841 may execute on the same X2 brokering server 801; in other embodiments, these modules may execute on remote machines connected via a network. In some embodiments, a remote failover X2 brokering server (not shown) may be made available for handling failures at X2 brokering server 801. The failover mechanism may involve checkpointing operations at X2 brokering server 801 in each of the modules therein. Certain operations may be hardware accelerated, such as network processing tasks, IPsec tasks, deep packet inspection tasks, or other tasks.

X2 brokering server 801 may include one or more network interfaces; these network interfaces may include Ethernet (10/100/1000/10000 Mbit) interfaces, Wi-Fi (802.11a/b/g/n/ac/af/ad) interfaces, 3G or 4G interfaces, virtual interfaces, or other interfaces. In some embodiments, one network interface may be directed towards the core network and located at, or coupled to, EPC module 821; this interface would communicate using the S1 protocol to MME 804 and using the X2 protocol to macro cells 805, 806. In some embodiments, another network interface may be directed towards one or more RANs internal to the gateway and connected to RAN module 831, for communicating to RANs 802, using either S1 or X2 as appropriate. Translation or interworking of protocols may occur at one or more of modules 811, 821, 831, or 841 as appropriate. In some embodiments, SON module 811 may also be coupled to an interface for communicating with RANs 802, 803; this interface may be labeled the SON interface, and the NETCONF protocol (XML over HTTPS) may be used to communicate in a proprietary or non-proprietary manner with RANs 802, 803 regarding network configuration, orchestration, and coordination operations.

Figure 9:
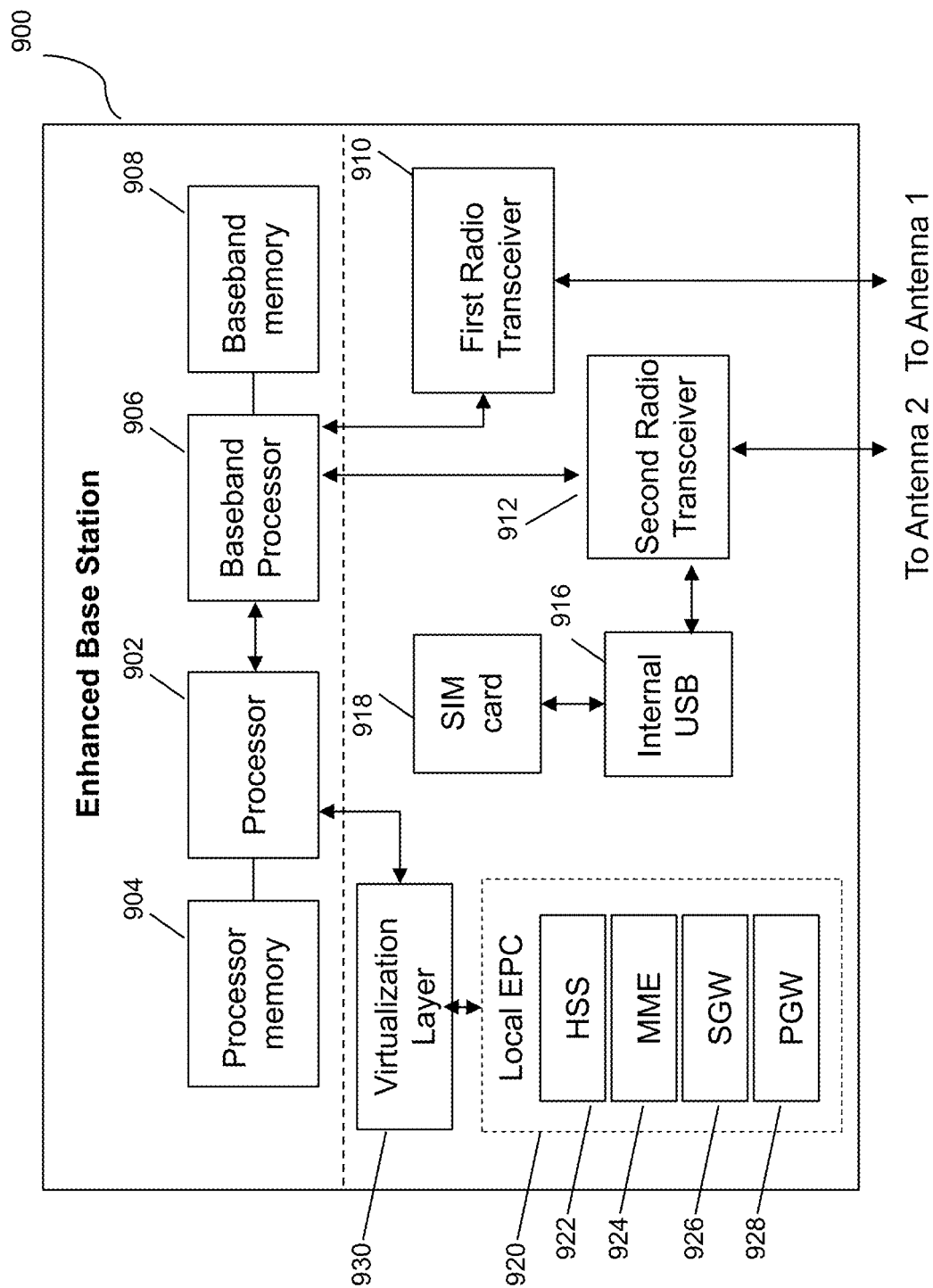
FIG. 9 is a schematic diagram of an enhanced base station, in accordance with some embodiments.

FIG. 9 is a schematic diagram of an enhanced base station, in accordance with some embodiments. The enhanced base station may be a mesh network base station. Mesh network base station 900 may include processor 902, processor memory 904 in communication with the processor, baseband processor 906, and baseband processor memory 908 in communication with the baseband processor. Base station 900 may also include first radio transceiver 910 and second radio transceiver 912, internal universal serial bus (USB) port 916, and subscriber information module card (SIM card) 918 coupled to USB port 914. In some embodiments, the second radio transceiver 912 itself may be coupled to USB port 916, and communications from the baseband processor may be passed through USB port 916.

A virtualization layer 930 may also be included for mediating communications with an evolved packet core EPC, specifically including the core network EPC (not shown) and local evolved packet core (EPC) module 920. Local EPC 920 may be used for authenticating users and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Virtualization layer 930 and local EPC 920 may each run on processor 902 or on another processor, or may be located within another device.

Processor 902 and baseband processor 906 are in communication with one another. Processor 902 may perform routing functions, and may determine if/when a switch in network configuration is needed. Baseband processor 906 may generate and receive radio signals for both radio transceivers 910 and 912, based on instructions from processor 902. In some embodiments, processors 902 and 906 may be on the same physical logic board. In other embodiments, they may be on separate logic boards.

The first radio transceiver 910 may be a radio transceiver capable of providing LTE eNodeB functionality, or 5G gNodeB functionality, and may be capable of higher power and multi-channel OFDMA. The second radio transceiver 912 may be a radio transceiver capable of providing LTE UE functionality. Both transceivers 910 and 912 are capable of receiving and transmitting on one or more LTE bands. In some embodiments, either or both of transceivers 910 and 912 may be capable of providing both LTE eNodeB and LTE UE functionality. Transceiver 910 may be coupled to processor 902 via a Peripheral Component Interconnect-Express (PCI-E) bus, and/or via a daughtercard. As transceiver 912 is for providing LTE UE functionality, in effect emulating a user equipment, it may be connected via the same or different PCI-E bus, or by a USB bus, and may also be coupled to SIM card 918.

SIM card 918 may provide information required for authenticating the simulated UE to the evolved packet core (EPC). When no access to an operator EPC is available, local EPC 920 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 910 and 912, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 902 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 910 and 912. Baseband processor 906 may use memory 908 to perform these tasks.

Additional embodiments of the present application are contemplated. In particular, message suppression/creation/deduplication in the X2AP context is similar to the message suppression, etc. context described with respect to S1 in US20160044531A1, and any and all methods in that disclosure may be used as appropriate with respect to X2, Xn, etc. and the present disclosure.

In the present disclosure, the words "eNB," "eNodeB," and "gNodeB" are used to refer to a cellular base station. However, one of skill in the art would appreciate that it would be possible to provide the same functionality and services to other types of base stations, specifically to home eNodeBs (HeNodeBs), as well as any equivalents.

In the present disclosure, the words "federated," "virtualized," "proxy" or "proxied" may be viewed as aspects of the same concept. For example, it may be understood that the federated X2 gateway provides X2 virtualization, in that it federates X2 messages from a plurality of eNodeBs and virtualizes the plurality of eNodeBs to provide a single virtualized eNodeB. The X2 gateway provides this federation or virtualization at least in part by providing proxy functionality, such that X2 messages from each of the plurality of eNodeBs may be proxied by the X2 gateway to and from an EPC or core network node. Other meanings would be apparent to one having ordinary skill in the relevant technology area. The X2 gateway could be part of an LTE access controller or core network node, part of an eNodeB, co-located with another device, or on its own independent device.

While the present disclosure uses the terms "small cell" and "macro cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc. The word "X2" herein may be understood to include X2 or also Xn, as appropriate.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
associating a first base station with a first base station identifier at a signaling protocol gateway, the signaling protocol gateway providing gateway services for a control plane signaling protocol between base stations, and with a first Internet Protocol (IP) address of the signaling protocol gateway, the first station being an aggregated base station;
associating a second base station with a second base station identifier at the signaling protocol gateway, and with a second IP address of the signaling protocol gateway, wherein the second IP address of the signaling protocol gateway is a different IP address than the first IP address of the signaling protocol gateway, the second base station being an aggregated base station;
establishing a first signaling protocol connection between a third base station and the first base station via the signaling protocol gateway with the first base station using the first IP address of the signaling protocol gateway; and
establishing a signaling protocol connection between the third base station and the second base station with the second base station using the second IP address of the signaling protocol gateway,
wherein the signaling protocol gateway provides stateful proxying of the signaling protocol connection and a dynamic mapping between the first base station identifier and the first IP address of the signaling protocol gateway, thereby enabling the third base station to establish a connection to the first and the second base station via the signaling protocol gateway without an IP address of the first base station and an IP address of the second base station;
the signaling protocol gateway performing brokering of X2 connections between the first and the second base station via an IP address of the signaling protocol gateway, the brokering of X2 connections including aggregating and abstracting small cells; and
wherein a cell on one side of the gateway accesses the gateway as a proxy and the gateway virtualizes all cells on the other side of the gateway as a single eNodeB and will perform network address translation, proxying, silencing and suppression to enable desired semantics.

2. The method of claim 1, wherein the control plane signaling protocol between base stations is an X2 or Xn protocol, the first base station identifier is an extended cell global identifier (eCGI), and the first base station is an eNodeB or gNodeB.

3. The method of claim 1, further comprising:
associating the third base station with a third base station identifier and a third IP address of the signaling protocol gateway,
associating a fourth base station with a fourth base station identifier and a fourth IP address of the signaling protocol gateway,
establishing a signaling protocol connection between the first base station and the third base station using the third IP address of the signaling protocol gateway, and
establishing a signaling protocol connection between the first base station and the fourth base station using the fourth IP address of the signaling protocol gateway,
thereby enabling the first base station to establish a connection to the third and the fourth base station via the signaling protocol gateway without an IP address of the third base station and an IP address of the fourth base station.

4. The method of claim 1, further comprising the signaling protocol gateway providing a single gateway for establishing a plurality of signaling protocol connections with a plurality of virtualized base stations.

5. The method of claim 1, wherein the first base station identifier is the second base station identifier.

6. The method of claim 1, wherein the first base station identifier and the second base station identifier are cell global identifiers (CGI) or extended CGI (eCGI) identifiers and wherein the first base station identifier and the second base station identifier differ in their lower eight bits.

7. The method of claim 1, further comprising the signaling protocol gateway receiving requests from the first or second base station at a first network interface, and sending responses to the third base station using a second network interface.

8. The method of claim 1, further comprising the signaling protocol gateway multiplexing multiple signaling protocol connections over a single stream control transmission (SCTP) connection.

9. The method of claim 1, further comprising assigning IP addresses at the signaling protocol gateway from a pool of IP addresses, and associating the assigned IP addresses with base station identifiers, and translating the associated IP addresses to and from the base station identifiers.

10. The method of claim 1, further comprising receiving, at the signaling protocol gateway, a message from the first base station for the third base station, rewriting the message to indicate the first IP address of the signaling protocol gateway as a source IP address, and sending the message to the third base station.

11. The method of claim 1, further comprising advertising the first and second IP addresses of the signaling protocol gateway for the first base station and the second base station to the third base station.

12. The method of claim 1, further comprising receiving a first message from the first base station, receiving a second message from the second base station, and proxying the first message but not the second message to the third base station.

* * * * *